United States Patent
Langereis et al.

(10) Patent No.: US 7,136,336 B2
(45) Date of Patent: Nov. 14, 2006

(54) OPTICAL RECORD CARRIER RECORDING METHOD AND APPARATUS

(75) Inventors: Gerardus Rudolph Langereis, Eindhoven (NL); Benno Tieke, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 803 days.

(21) Appl. No.: 10/223,791

(22) Filed: Aug. 20, 2002

(65) Prior Publication Data

US 2003/0063543 A1 Apr. 3, 2003

(30) Foreign Application Priority Data

Aug. 24, 2001 (EP) ............................................. 01203184

(51) Int. Cl.
G11B 7/00 (2006.01)

(52) U.S. Cl. .................. 369/53.11; 369/47.5; 369/59.1; 369/59.11; 369/116

(58) Field of Classification Search ................ 369/47.1, 369/47.15, 47.5, 47.53, 53.1, 53.11, 59.1, 369/59.11, 116
See application file for complete search history.

(56) References Cited

U.S. PATENT DOCUMENTS

| | | | | |
|---|---|---|---|---|
| 5,305,297 A | * | 4/1994 | Nishiuchi et al. ........... | 369/116 |
| 6,362,754 B1 | | 3/2002 | Van Dijk et al. ............. | 341/59 |
| 6,504,806 B1 | * | 1/2003 | Nakajo ..................... | 369/59.12 |
| 6,704,269 B1 | * | 3/2004 | Ogawa ....................... | 369/116 |

FOREIGN PATENT DOCUMENTS

| | | |
|---|---|---|
| JP | 2001143263 | 5/2001 |
| WO | WO0057417 | 9/2000 |

OTHER PUBLICATIONS

"Multiple Values Per Pit On Optical Storage" IBM Technical Disclosure Bulletin, IBM Corp. New York, US, vol. 36, No. 7, Jul. 1, 1993, pp. 187–188.

* cited by examiner

Primary Examiner—Muhammad Edun
(74) Attorney, Agent, or Firm—Edward W. Goodman

(57) ABSTRACT

An optical record carrier recording method forms pits and lands by directing a radiation beam (12) onto a recording surface (21) of an optical record carrier (20). The radiation beam for each pit to be recorded is set to at least one write power level ($P_w$) capable of forming a pit during a write power irradiation period (31) and, for each land between the pits, to at least one bottom power level ($P_0$) incapable of forming a pit during a bottom power irradiation period (51). In order to embed bits of an additional LML channel in the main channel without increasing the overall jitter, the bottom power level ($P_0$) is temporarily raised to an LML land power level ($P_{l1}$) during an LML land irradiation period (55) for forming an LML land, the LML land power level ($P_{l1}$) being close to the write power level ($P_w$), and that the write power level ($P_w$) is temporarily lowered to an LML pit power level ($P_{p1}$) during an LML pit irradiation period (35) for forming an LML pit, the LML pit power level ($P_{p1}$) being close to the bottom power level ($P_0$).

21 Claims, 6 Drawing Sheets

OPTICAL RECORD CARRIER RECORDING METHOD AND APPARATUS

BACKGROUND OF THE INVENTION

Field of the Invention

The invention relates to an optical record carrier recording method for forming pits and lands by directing a radiation beam onto a recording surface of an optical record carrier, the radiation beam for each pit to be recorded being set to at least one write power level capable of forming a pit during a write power irradiation period and, for each land between the pits, to at least one bottom power level incapable of forming a pit during a bottom power irradiation period. The invention also relates to a corresponding optical record carrier recording device for carrying out such method.

Description of the Related Art

Such a recording method is known from the Compact Disc Recordable (CD-R) System Description (also known as the Orange-Book). A pit is formed by applying a radiation beam having a write power level to a recording surface of an optical record carrier during a write power irradiation period. The time length of the write power irradiation period depends on the length of the pit to be recorded. The length of a pit is represented by a parameter nT, where T represents the time length of one period of a reference clock in a data signal, and n represents a predetermined integer number. For a CD-R system, n is in a range from 3 to 11. For forming a land, the radiation beam is set to a bottom power level which is lower than the write power level during a bottom power irradiation period.

A method for embedding a stream of bits of a secondary channel in a stream of bits of a main channel is known from International Patent Application No. WO 00/57417 A1, corresponding to U.S. Pat. No. 6,362,754. Therein, the bits of the secondary channel are embedded in the main channel by Limited Multi-Level (LML) coding. While the stream of bits of the main channel is encoded in the zero crossings of a reflection signal, the bits of the secondary (LML) channel are encoded in the amplitudes of reflection, i.e., the amplitude levels of the pits and of the lands are used for encoding the bits of the secondary channel.

SUMMARY OF THE INVENTION

It is an object of the present invention to provide an optical record carrier recording method and a corresponding apparatus which allow the application of LML coding on recordable optical record carriers and satisfy the following criteria:

an acceptable difference between a normal runlength modulation and its corresponding LML equivalent should be achieved, that is, preferably a reduction of 30% in the land modulations and an increase of 30% in the pit modulations, and the length of the reduced effect as seen in the high frequency signal should be equal to the length of an unmodified effect.

Preferably, the thermal cross-talk towards preceding and succeeding effects should be maintained with respect to cross-talk as observed with the unmodified effect. Furthermore, the LML effects should preferably be fully exchangeable with normal effects without increasing the overall jitter. The jitter is the standard deviation of the time difference between level transitions in a digitized read signal and the corresponding transitions in a clock signal, the time difference being normalized by the duration of one period of said clock.

This object is achieved by an optical record carrier recording method for forming pits and lands by directing a radiation beam onto a recording surface of an optical record carrier, the radiation beam for each pit to be recorded being set to at least one write power level capable of forming a pit during a write power irradiation period and for each land between the pits to at least one bottom power level incapable of forming a pit during a bottom power irradiation period, which is characterized in that the bottom power level is temporarily raised to an LML land power level during an LML land irradiation period for forming an LML land, the LML land power level being close to the write power level, and that the write power level is temporarily lowered to an LML pit power level during an LML pit irradiation period for forming an LML pit, the LML pit power level being close to the bottom power level. According to the invention, the amplitude of reflection of a signal stored on the optical record carrier is influenced by controlling the power level of the radiation beam when forming pits and lands. Thus, it can be decided if a "normal" pit or an LML pit having different amplitudes of reflection shall be written or if a "normal" land or an LML land having different amplitudes of reflection shall be written.

According to the invention, the LML land power level and the LML pit power level are optimized for minimum jitter. The LML land power level is selected such that a less brighter land is written, while the LML pit power level is selected such that a less darker pit is written, that is, compared to "normal" lands and pits. Thus, for LML, the envelope of the eye-patterns is reduced. For lands, the relatively high reflection level is reduced, while it is increased for the relatively low reflection level in the pits.

There are different parameters for optimization of said write strategy. In particular, the time length of the temporary raise of the bottom power level, the time length of the temporary lowering of the write power level, as well as the levels of the LML land power and the LML pit power can be optimized to find a compromise where there is sufficient reduction in amplitude while the lowest increase in cross-talk is observed and the increase in jitter is minimized. The LML land power level is at least controlled such that it is close to the write power level, and the LML pit power level is at least controlled such that it is close to the bottom power level, preferably higher than the bottom power level. Preferably, the LML land power level is set to within a range of 0.70 to 1.30, in particular 0.90 to 1.1, times the write power level and that the LML pit power level is set to within a range of 0.05 to 0.50, in particular 0.1 to 0.4, times the write power level. The specific values for said power levels are achieved by optimizing the time duration of the temporary lowering or raising, respectively, of the power levels.

The temporary lowering of the LML pit power level should preferably be slightly shifted to the second half or the end of the write power irradiation period. Correct positioning of the location of the temporary lowering is essential to have a symmetrical lowering of the modulation. Similarly, the temporary raise to the LML land power level is preferably located slightly in the first half of the bottom power irradiation period.

To ensure some peak temperatures which determine the thermal cross-talk, the write power level is temporarily raised to an LML pit correction power level during a write power irradiation period, the LML pit correction power level being higher than the write power level according to a preferred embodiment. Advantageously, the LML pit correction power level is set to within a range of 1.01 to 1.30, in particular 1.01 to 1.10, times the write power level.

In order to control the effect length in pits or lands, respectively, the write power irradiation period and/or the bottom power irradiation period are increased by an additional write power irradiation period or additional bottom power irradiation period, respectively. The thermal crosstalk towards the preceding pit may appear to be too much, particularly when temporarily raising the write power level to an LML pit correction power level during said LML pit irradiation period. Increasing the pulse length enables the nominal power to be lowered, resulting in lower thermal cross-talk to neighboring pits.

Preferably, the LML pit increase power level is set to within a range of 0.50 to 0.95 times the write power level, in particular to within a range of 0.80 to 0.90 times the write power level, and the LML land increase power level is set to within a range of 0.03 to 0.70, in particular 0.03 to 0.50, times the write power level. The additional write power irradiation period and/or the additional bottom power irradiation period has preferably a time length of 0.2 to 0.7T, in particular 0.5T or 0.25T, respectively.

The LML land irradiation period and/or the LML pit irradiation period has preferably a time length of 0.5T to 2T, in particular 1T to 1.25T. Such periods are preferably short, but the shorter such periods, the higher the power levels will have to be during said periods. In general, the longer the runlength of a pit or a land is, the longer can the LML pit irradiation period or the LML land irradiation period, respectively, be selected.

As an alternative write strategy for recordable optical media, use can be made of a pulsed strategy according to which, for recording pits, the radiation beam is set to the write power level in the form of write pulses, and that for forming an LML pit, by temporary lowering of the write power level at least one write pulse is left out. Preferably, the write power level of the remaining write pulses is then increased compared to the normal write power level of the write pulses for forming a "normal" pit.

The invention also relates to an optical record carrier recording device comprising a radiation source and control means for carrying out the method according to the invention. Preferably, said device also comprises jitter control means for measuring and minimizing the jitter by controlling the power of the radiation beam and the duration and time length of the power levels as explained above.

Although the invention is explained by using a CD-R system as an example, it will be apparent to a person skilled in the art that the invention may also be applied to alternative optical recording systems.

BRIEF DESCRIPTION OF THE DRAWINGS

The invention will now be explained in more detail with reference to the drawings, in which.

DESCRIPTION OF THE PREFERRED EMBODIMENTS

Figure 1:
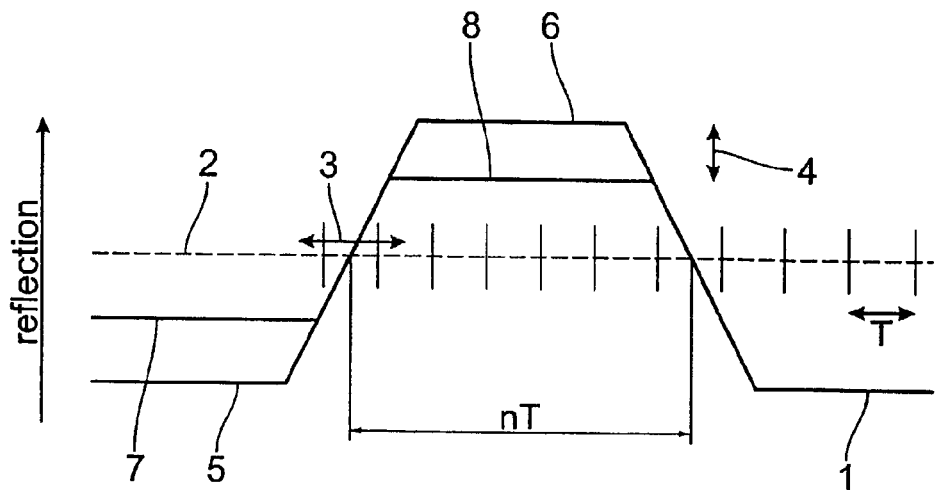
FIG. 1 shows a diagram illustrating multi level coding.

FIG. 1 illustrates the concept of Limited Multi Level (LML) coding. A reflection signal 1 is shown into which a stream of data of a main channel is encoded using a Run Length Limited (RLL) code, and a stream of data of a secondary channel (LML channel) is encoded using LML coding. While RLL coding uses a spatial modulation of the zero crossings of the signal 1 with a slicer level 2 as indicated by an arrow 3, LML coding uses an amplitude modulation of the reflection amplitude as indicated by an arrow 4. The runlength, i.e., the length of pits and lands, is represented by a parameter n·T, where T represents the time length of one period of a reference clock in a data signal and n represents a predetermined integer number. For a CD-R system the runlength is limited to a range from 3 to 11, i.e., $3 \leq n \leq 11$.

The LML modulation is primarily introduced for longer runlengths, for example, in CD-R systems for runlengths equal to or greater than 5T. By controlling the reflection amplitude of each pit and land for such longer runlengths, an additional bit value can be embedded into each such longer runlength. A "normal" pit 5 and a "normal" land 6, both having normal amplitudes of reflection, can then be interpreted as bits having bit value zero, while an LML pit 7 or an LML land 8, each having a reduced amplitude of reflection, can be interpreted as bits having a bit value 1, or vice versa.

The reduction of the amplitude is preferably realized in the middle area of the runlength. For short runlengths, the reduced middle area is close to the leading and trailing edges of the runlength. The impulse response of the channel causes an increase in the jitter of the leading and trailing edges. Furthermore, for straightforward detection of the LML-information, a single slicer level shall be used for all possible runlengths. Therefore, LML coding is limited to those runlengths that reach full modulation in the eye-pattern.

Figure 2:
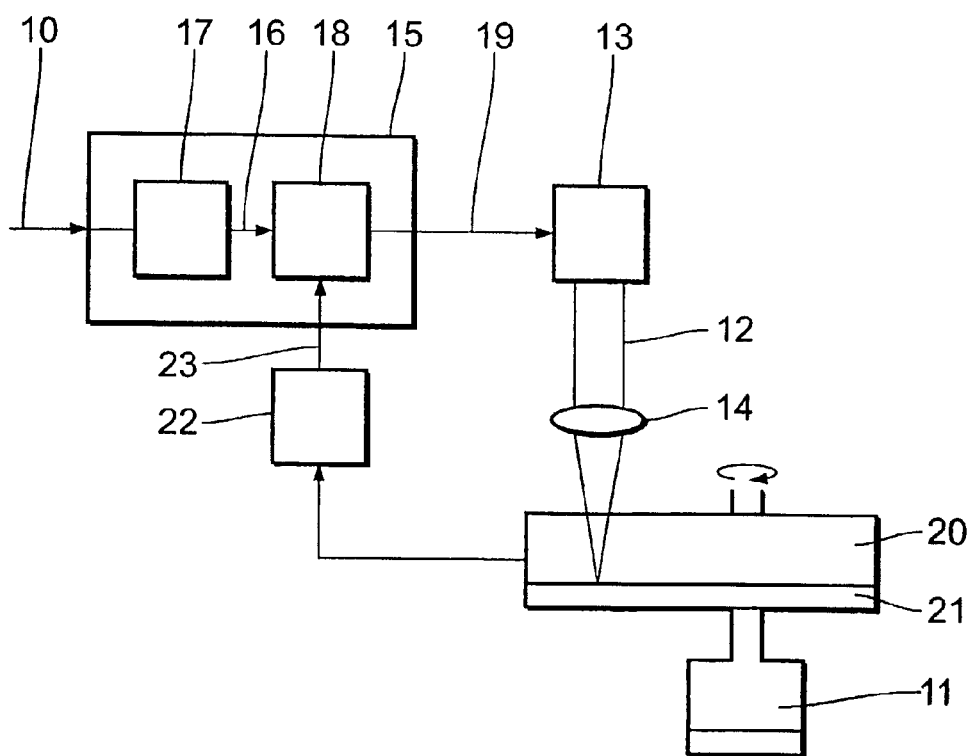
FIG. 2 shows an embodiment of a recording device according to the invention.

FIG. 2 shows an optical record carrier recording device according to the invention for recording a data signal 10 onto the recording surface 21 of a disc-shaped optical record carrier 20. The optical record carrier 20 is rotated around its center by a motor 11. A radiation beam 12 is generated by a radiation source 13 and focussed onto the recording surface 21 by a lens 14.

The data signal 10 is applied to control means 15. Therein, the data signal 10 is converted into a control signal 16 by a conversion unit 17 which is applied to a control unit 18. Therein, a radiation control signal 19 is generated for controlling the radiation power to be generated by the radiation source 13.

In order to control the power of the radiation beam and the duration and time length of the power levels such that the resultant jitter is minimized, a jitter control unit 22 is provided for measuring the jitter after the writing of signals on the optical record carrier 20. Said measurement and control by the jitter control unit 22 take place during the writing of the signal on the optical record carrier 20, that is, by generating a jitter control signal 23 which is also applied to said control unit 18.

The method according to the invention will now be explained in more detail with reference to several examples as shown in the FIGS. 3A/3B to 7A/7B which show several write signals for writing pits, lands, LML bits or LML lands.

Figure 3A:
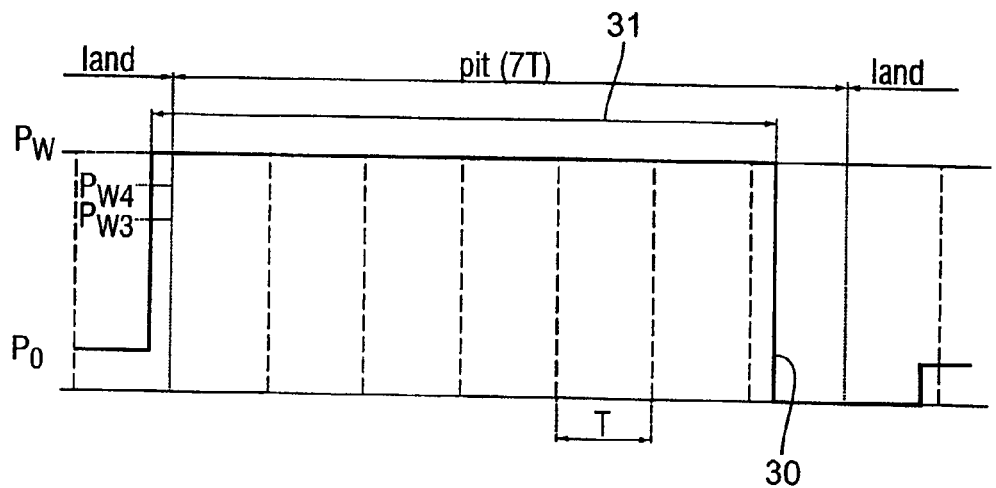
FIGS. 3A and 3B show a diagram illustrating writing of an I7 pit.

FIG. 3A shows a write signal 30 for forming a normal pit having a runlength of 7T (often referred to as an I7 pit) on the record carrier. In order to form a preceding land, the power of the radiation beam is set to a bottom power level $P_0$ which is preferably identical to a read power level. For writing the I7 pit thereafter, the power level is raised to a write power level $P_W$ for a write power irradiation period 31 which equals 6.5T in this particular embodiment. Before forming a subsequent land, the power level is first lowered to zero and subsequently set to the bottom power level $P_0$ for forming the land.

Figure 3B:
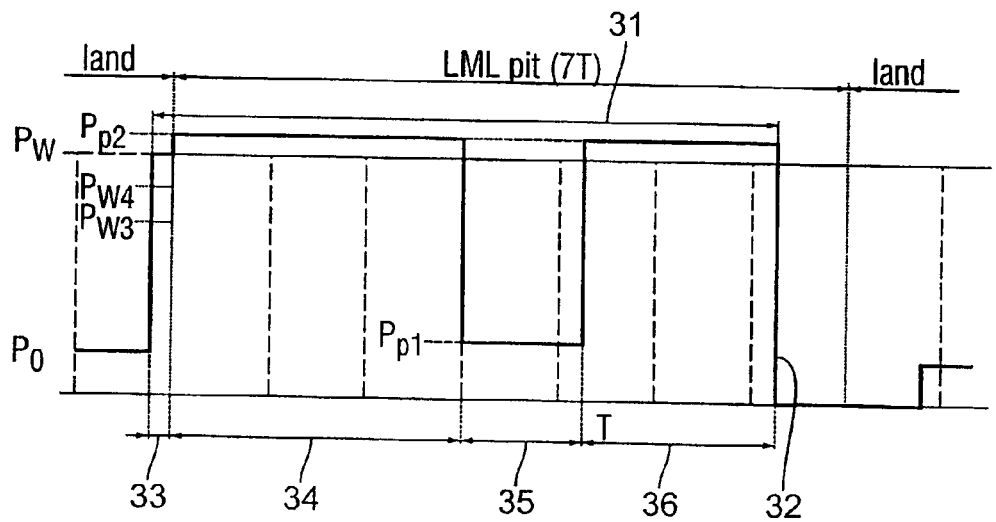

FIG. 3B shows a write signal 32 for forming an I7 LML pit having the same runlength of 7T. For forming said LML pit, the power level is first raised to the write power level $P_W$ after the writing of the previous land for a very short period 33. Subsequently, the power level is further raised to an LML pit power level $P_{p2}$ during a first pit correction period 34 which is almost half of the write power irradiation period 31. After that, the power level is drastically reduced to an LML pit power level $P_{p1}$ during an LML pit irradiation period 35 before it is again raised to the LML pit correction power level $P_{p2}$ for a second pit correction period 36 until the LML pit is completed.

As can be seen from FIG. 3B, the LML pit correction power level $P_{p2}$ is higher than the write power level $P_W$. Generally speaking, the LML pit correction power level $P_{p2}$ is set within a range of 1.01 to 1.30 times the write power level $P_W$. In the specific embodiment for writing an I7 LML pit as shown, the LML pit correction power level $P_{p2}$ is set to 1.1 times the write power level $P_W$.

The LML pit power level $P_{p1}$ is generally set within a range of 0.05 to 0.5 times the write power level $P_W$. In the specific embodiment shown in FIG. 3B, it is preferably set to 0.1 times the write power level $P_W$. In general, the LML pit power level $P_{p1}$ is close to the bottom power level $P_0$, preferably higher than the bottom power level $P_0$.

The temporary lowering of the power level during the LML pit irradiation period 35 is preferably shifted to the end of the write pulse. Correct positioning of the location of the LML pit irradiation period 35 is essential to achieve symmetrical lowering of the modulation. The duration of said period 35 and the power level $P_{p1}$ itself can be used to find a compromise where there is sufficient reduction in amplitude and the lowest increase in cross-talk is observed. In the example shown in FIG. 3B, the period has a duration of 1.25T.

The power level set during the initial period 33 can be adapted to the heat stored in the record carrier after writing a previous land. After a short land is formed, residual heat of the previous pit will be present in the record carrier. In that case, the next pit should be written with a reduced initial power with respect to the case where this pit is preceded by a long land. This method is called thermal balancing. The pit strategy then depends on the neighboring lands. This is also illustrated in FIGS. 3A, 3B. If the land before the pit or the LML pit, respectively, is a short land, in particular, an I3 or I4 land, i.e., a land having a runlength of 3T or 4T, the power level should be set to an initial reduced write power level $P_{W3}$ (for I3-land) or $P_{W4}$ (for I4-land) during the initial period 33.

Figure 4A:
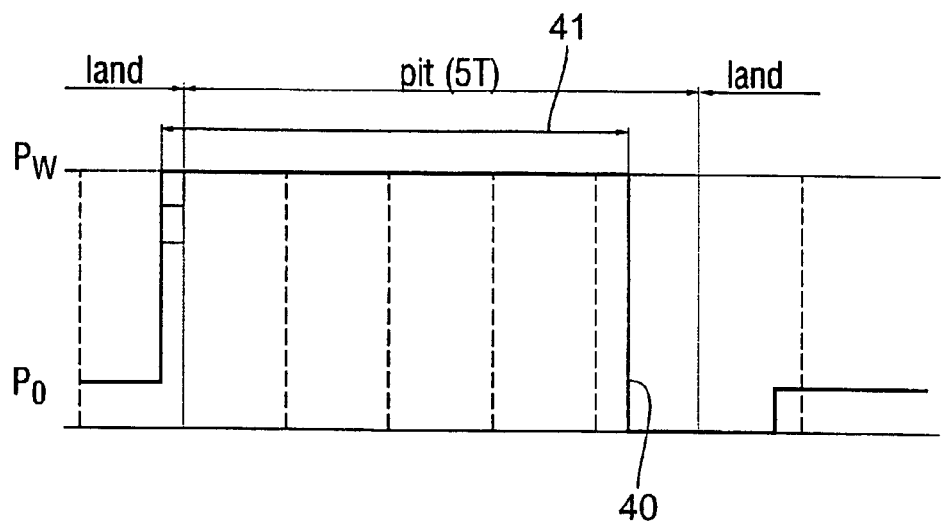
FIGS. 4A and 4B show a diagram illustrating writing of an I5 pit.
Figure 4B:
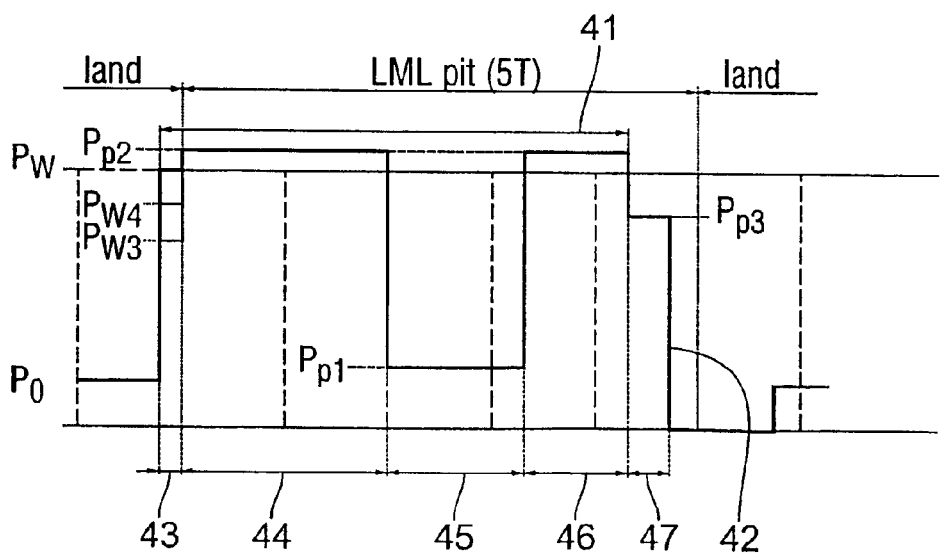

FIGS. 4A, 4B show another embodiment for writing a normal I5 pit and an I5 LML pit. The write signal 40 for writing the I5 pit, as shown in FIG. 4A, is substantially identical to the write signal 30 for writing the I7 pit as shown in FIG. 3A, that is, except for the length of the write power irradiation period 41 which is shorter than the corresponding period 31. The write signal 42 for forming an I5 LML pit, as shown in FIG. 4B, is also quite similar to the write signal 32, as shown in FIG. 3B, for forming the I7 LML pit except for the certain power levels and the durations for which these power levels are set.

During the initial period 43, the power level is, at first, set to the write power level $P_W$ or, if the previous land is quite short, to a reduced write power level as explained above. Subsequently, during the first correction period 44, the power level is set to the LML pit correction power level $P_{p2}$ which is preferably set to 1.07 times the write power level $P_W$ in the present embodiment. After nearly half of the write power irradiation period 41, the power level is reduced to the LML pit power level $P_{p1}$ during the LML pit irradiation period 45, the LML pit power level $P_{p1}$ preferably being set to 0.35 times the write power level $P_W$. Subsequently, the power level is again raised to the LML pit correction power level $P_{p2}$ during a second pit correction period 46. The period 45 again has a duration of 1.25T.

Control of the side lobes, i.e., an increase in the normal write power, during the correction periods 44, 46 is essential to ensure peak temperatures which determine the thermal cross-talk. In the case of the I5 LML pit as shown in FIG. 4B, the LML pit correction power level $P_{p2}$, used for the I7 LML pit as shown in FIG. 3B, appeared to be inadequate to compensate for the loss in pit length. First, the power level would be too large since a power level of more than 1.1 times the write power level $P_W$ would increase the maximum required power and the thermal cross-talk towards the preceding pit also appeared to be too much. Therefore, in the present embodiment, the length of the write pulse is physically increased by an LML pit increase period 47 of 0.5T during which the power level is reduced to an LML pit increase power level $P_{p3}$. Said LML pit increase power level $P_{p3}$ is generally set to within a range of 0.5 to 0.9 times the power level $P_W$. In the specific embodiment shown here, it is set to 0.9 times the write power level $P_W$. Increasing the pulse length of the signal 42 enables the nominal power to be lowered, resulting in less thermal cross-talk to neighboring pits.

Figure 5A:
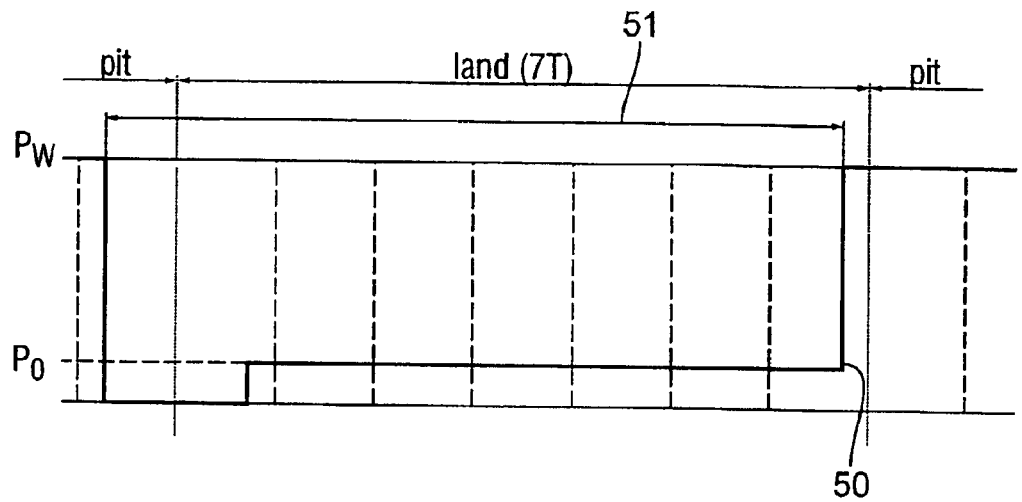
FIGS. 5A and 5B show a diagram illustrating writing of an I7 land.
Figure 5B:
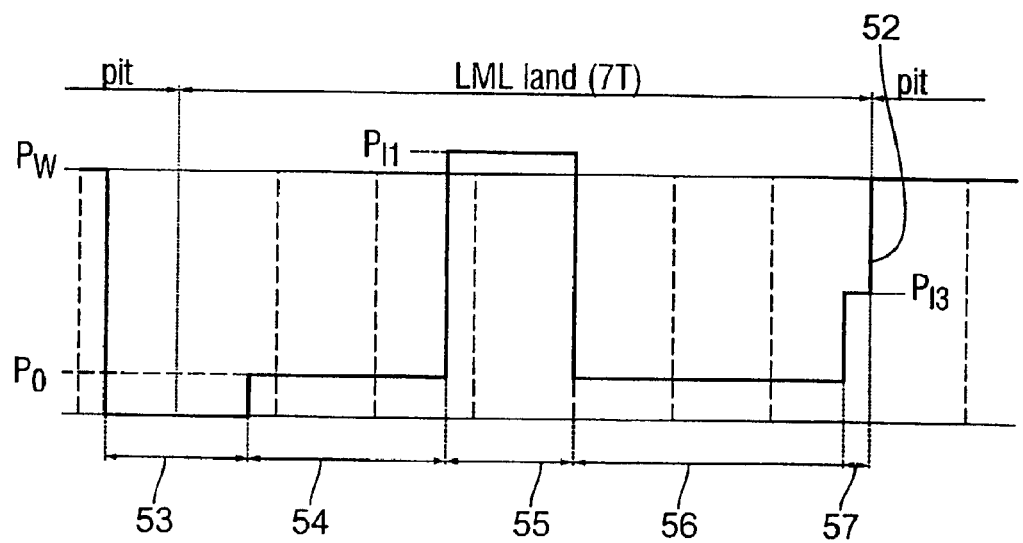

FIGS. 5A/5B and 6A/6B show corresponding write signals for writing lands and LML lands. FIG. 5A shows a write signal 50 for writing a normal land having a runlength of 7T. As can be seen therein, at the beginning of the bottom power irradiation period 51, the power level is set to zero, and after a short period, it is raised to the bottom power level $P_0$. In FIG. 5B, a write signal 52 for writing an LML land having the same runlength of 7T is shown. Again, during the initial period 53, the power level is set to zero, while it is subsequently raised to the bottom power level $P_0$ during a first land write period 54. The power level is subsequently raised to an LML land power level $P_{l1}$ during an LML land irradiation period 55 before the power level is again lowered to the bottom power level $P_0$ during the second land write period 56. In order to lower the nominal power, resulting in less thermal cross-talk to neighboring pits, the pulse length of the LML land pulse, i.e., the bottom power irradiation period 51, is increased by an additional bottom power irradiation period 57 during which the power level is raised to an LML land increase power level $P_{l3}$.

Generally speaking, the LML land power level $P_{l1}$ is set to within a range of 0.7 to 1.3 times the write power level $P_W$. In the specific embodiment for forming an I7 LML land, the LML land power level $P_{l1}$ is set to 1.1 times the write power level $P_W$. The LML land increase power level $P_{l3}$ is generally set to within a range of 0.03 to 0.75 times the write power level $P_W$. In the embodiment shown in FIG. 5B, it is preferably set to 0.5 times the write power level $P_W$. The period 55 has a duration of 1.25T.

Figure 6A:
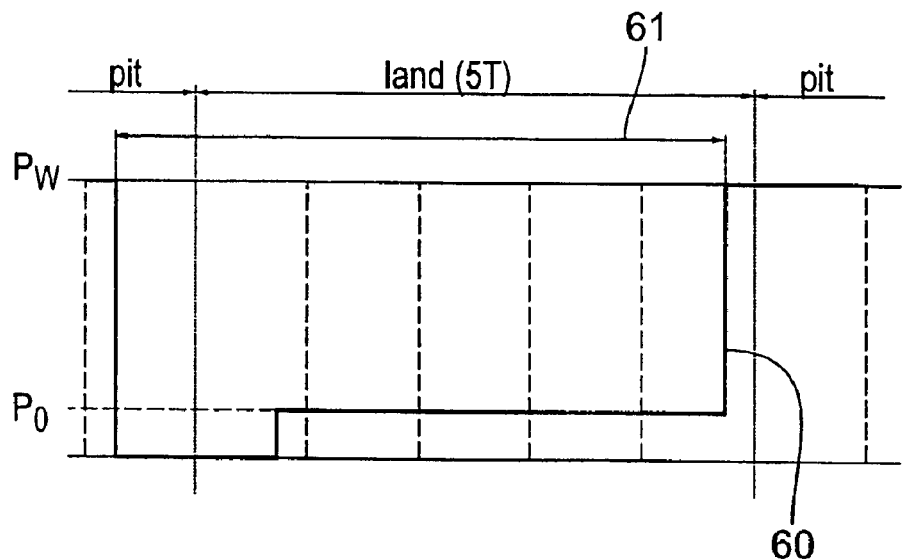
FIGS. 6A and 6B show a diagram illustrating writing of an I5 land.
Figure 6B:
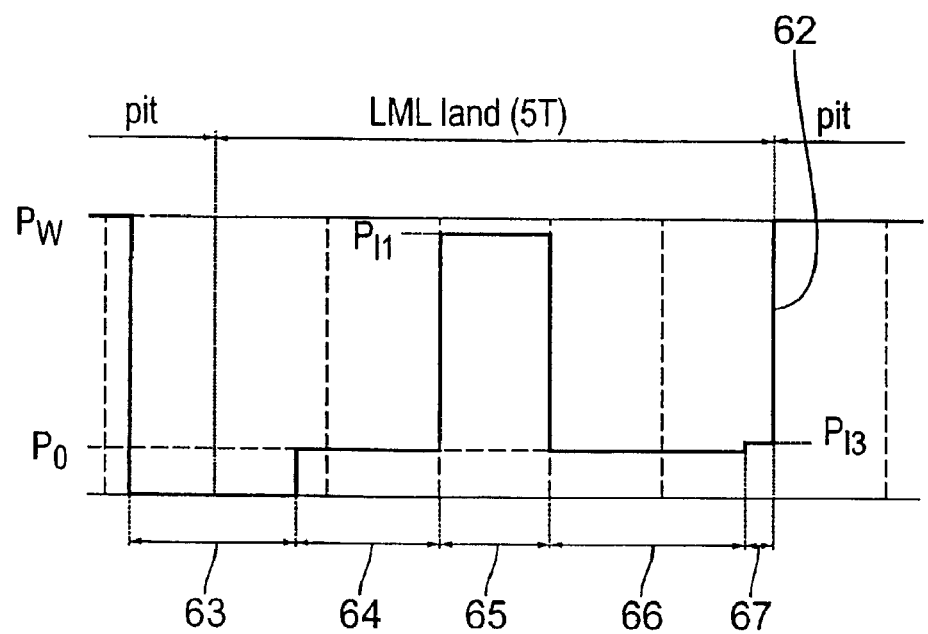

FIGS. 6A, 6B show embodiments for forming an I5 land and an I5 LML land. The write signal 60 is shown therein for forming an I5 land which is identical to the write signal 50 shown in FIG. 5A, except for a shorter bottom power irradiation period 61. FIG. 6B shows a write signal 62 which is also identical to the write signal 52 shown in FIG. 5B, except for the power levels $P_{l1}$ and $P_{l3}$ and the durations of the periods 63 to 67. In this embodiment, the LML land power level $P_{l1}$ is set to 0.9 times the write power level $P_W$, and the LML land increase power level $P_{l3}$ is set to 0.03 times the write power level $P_W$. Here, the period 65 has a duration of 1T.

The parameters described above with reference to the FIGS. 3A/3B to 6A/6B are used according to the invention to control the write signal such that there is an acceptable difference between a normal runlength modulation and its corresponding LML equivalent. When LML pits and lands have modulations which are 30% lower than the unmodified pits and lands, bit detection in the LML channel is still quite robust while the original main RLL channel can be detected without any loss if the compensation levels are optimized correctly. Furthermore, adjustment of these parameters enables the runlength of the pits and lands to be made equal to the unmodified case. Finally, an optimization of the overall jitter, i.e., a minimization of the jitter, can be achieved.

A pulsed strategy can be an alternative write strategy for recordable optical media, like CD-R. Pulsed strategies are known to require more power. However, the modulation level of the LML-effects appears to be very sensitive to variations in write power, particularly when using a method based on thermal balancing as explained above. When using a pulse-based strategy, this problem is mainly overcome.

Figure 7A:
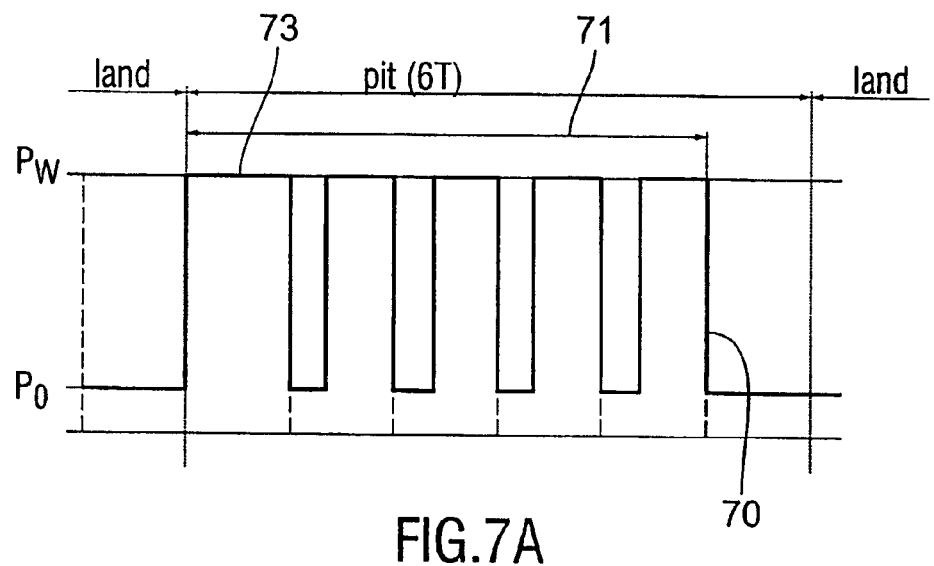
FIGS. 7A and 7B show a diagram illustrating writing of an I6 pit using a pulsed strategy.
Figure 7B:
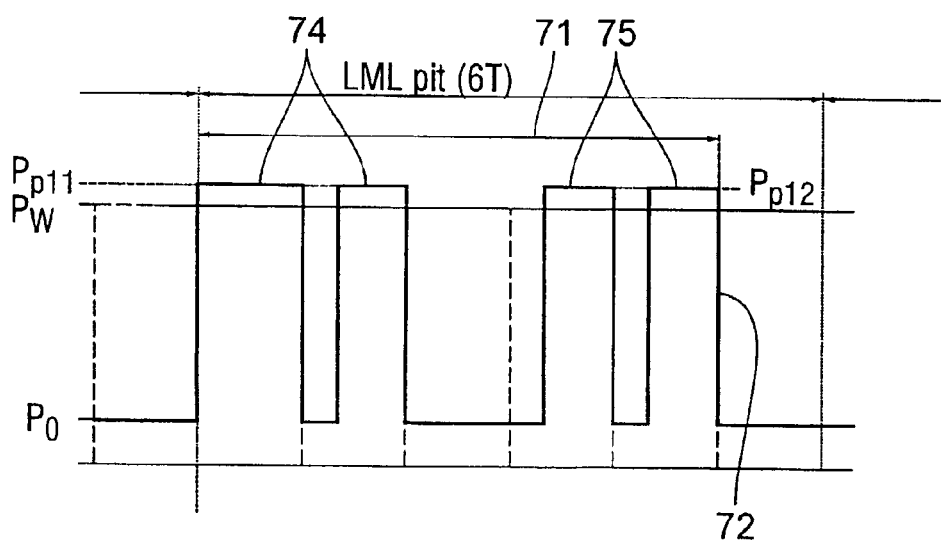

FIG. 7A shows a write signal 70 based on such a pulsed strategy for forming an I6 pit. During the write power irradiation period 71, a power level is switched five times between the write power level $P_W$ and the bottom power level $P_0$, i.e., the write signal 70 comprises five pulses 73 to form the I6 pit. FIG. 7B shows a corresponding write signal 72 for forming an I6 LML pit. Said signal 72 comprises only four pulses 74, 75, i.e., the middle one of the five pulses 73 shown in FIG. 7A is missing. Furthermore, during the pulse periods, the power level is raised to a higher level, that is, during the first two pulses 74 to a first LML pit power level $P_{pl1}$, and during the second two pulses 75 to a second LML pit power level $P_{pl2}$. Preferably, in the present embodiment shown in FIG. 7B, the first LML pit power level $P_{pl1}$ is set to 1.1 times the write power level $P_W$ and the second LML pit power level $P_{pl2}$ is set to 1.15 times the write power level $P_W$.

Even though the invention has been explained with reference to a recordable CD (CD-R), it will be apparent to a person skilled in the art that the invention can also be applied to all other recordable or rewritable optical recording media, such as rewritable CDs or DVDs like DVD–R, DVD+R, DVD-RAM. Furthermore, the invention is not limited to certain codes or codes underlying a certain runlength limitation. Moreover, the invention can be applied not only to pits or lands having a runlength as shown in the figures, but, in general, to all other runlengths as well.

What is claimed is:

1. An optical record carrier recording method for forming pits and lands by directing a radiation beam onto a recording surface of an optical record carrier, said recording method comprising the steps of:

setting the radiation beam for each pit to be recorded to at least one write power level ($P_w$) capable of forming a pit during a write power irradiation period and setting the radiation beam for each land between the pits to at least one bottom power level ($P_0$) incapable of forming a pit during a bottom power irradiation period, characterized in that said recording method further comprises the steps of:

temporarily raising the bottom power level ($P_0$) to an LML land power level ($P_{l1}$) during an LML land irradiation period for forming an LML land, the LML land power level ($P_{l1}$) being close to the write power level ($P_w$); and temporarily lowering the write power level ($P_w$) to an LML pit power level ($P_{p1}$) during an LML pit irradiation period for forming an LML pit, the LML pit power level ($P_{p1}$) being close to the bottom power level ($P_0$).

2. The optical record carrier recording method as claimed in claim 1, characterized in that in said temporarily raising step, the LML land power level ($P_{l1}$) is set to within a range of 0.70 to 1.30 times the write power level ($P_w$), and in said temporarily lowering step, the LML pit power level ($P_{p1}$) is set to within a range of 0.05 to 0.50 times the write power level ($P_w$).

3. The optical record carrier recording method as claimed in claim 1, characterized in that the LML pit irradiation period is situated at least mainly in the second half of a write power irradiation period.

4. The optical record carrier recording method as claimed in claim 1, characterized in that the LML land irradiation period is situated at least mainly in the first half of a bottom power irradiation period.

5. The optical record carrier recording method as claimed in claim 1, characterized in that the write power level ($P_w$) is temporarily raised to an LML pit correction power level ($P_{p2}$) during said write power irradiation period, the LML pit correction power level ($P_{p2}$) being higher than the write power level ($P_0$).

6. The optical record carrier recording method as claimed in claim 5, characterized in that the LML pit correction power level ($P_{p2}$) is set to within a range of 1.01 to 1.30 times the write power level ($P_w$).

7. The optical record carrier recording method as claimed in claim 5, characterized in that the LML pit correction power level ($P_{p2}$) is set to within a range of 1.01 to 1.10 times the write power level ($P_w$).

8. The optical record carrier recording method as claimed in claim 1, characterized in that the write power irradiation period is increased by an additional write power irradiation period, and that the write power level ($P_w$) is lowered to an LML pit increase power level ($P_{p3}$), the LML pit increase power level ($P_{p3}$) being higher than the LML pit power level ($P_{p1}$).

9. The optical record carrier recording method as claimed in claim 8, characterized in that the LML pit increase power level ($P_{p3}$) is set to within a range of 0.50 to 0.95 times the write power level ($P_w$).

10. An optical record carrier recording method as claimed in claim 8, characterized in that the additional write power irradiation period and/or the additional bottom power irradiation period has a time length of 0.2 to 0.7T, in particular 0.5T or 0.25T, respectively, where T represents the time length of one period of a reference clock in a data signal.

11. The optical record carrier recording method as claimed in claim 8, characterized in that the LML pit increase power level ($P_{p3}$) is set to within a range of 0.80 to 0.90 times the write power level ($P_w$).

12. The optical record carrier recording method as claimed in claim 1,
characterized in that the bottom power irradiation period is increased by an additional bottom power irradiation period, and the bottom power level ($P_0$) is raised to an LML land increase power level ($P_{l3}$), the LML land increase power level ($P_{l3}$) being lower than the write power level ($P_w$).

13. The optical record carrier recording method as claimed in claim 12,
characterized in that the LML land increase power level ($P_{l3}$) is set to within a range of 0.03 to 0.70 times the write power level ($P_w$).

14. The optical record carrier recording method as claimed in claim 12, characterized in that the LML land increase power level ($P_{l3}$) is set to within a range of 0.03 to 0.50 times the write power level ($P_w$).

15. The optical record carrier recording method as claimed in claim 1,
characterized in that the LML land irradiation period and/or the LML pit irradiation period has a time length of 0.5T to 2T where T represents the time length of one period of a reference clock in a data signal.

16. The optical record carrier recording method as claimed in claim 1,
characterized in that for recording pits, the radiation beam is set to the write power level in the form of write pulses, and that for forming an LML pit, write power level is temporarily lowered by leaving out at least one write pulse.

17. The optical record carrier recording method as claimed in claim 16,
characterized in that the write power level of the remaining write pulses is increased.

18. The optical record carrier recording method as claimed in claim 1, characterized in that in said temporarily raising step, the LML land power level (Pl1) is set to within a range of 0.90 to 1.1 times the write power level ($P_w$), and in said temporarily lowering step, the LML pit power level ($P_{p1}$) is set to within a range of 0.1 to 0.4 times the write power level ($P_w$).

19. The optical record carrier recording method as claimed in claim 1, characterized in that the LML land irradiation period and/or the LML pit irradiation period has a time length of 1T to 1.25T, where T represents the time length of one period of a reference clock in a data signal.

20. An optical record carrier recording device for recording data in the form of pits and lands by directing a radiation beam onto a recording surface of an optical record carrier, the optical record carrier recording device comprising:
a radiation source for providing the radiation beam; and
control means for controlling the power of the radiation beam such that for each pit to be recorded, the power is set to at least one write power level ($P_w$) capable of forming a pit during a write power irradiation period, and for each land between the pits, the power is set to at least one bottom power level ($P_0$) incapable of forming a pit during a bottom power irradiation period,
characterized in that the control means controls the power of the radiation beam such that the bottom power level ($P_0$) is temporarily raised to an LML land power level ($P_{l1}$) during an LML land irradiation period for forming an LML land, the LML land power level ($P_{l1}$) being close to the write power level ($P_w$), and that the write power level ($P_w$) is temporarily lowered to an LML pit power level ($P_{p1}$) during an LML pit irradiation period for forming an LML pit, the LML pit power level ($P_{p1}$) being close to the bottom power level ($P_0$).

21. The optical record carrier recording device as claimed in claim 20, characterized in that the optical record carrier recording device further comprises:
jitter control means for measuring and minimizing jitter by controlling the power of the radiation beam and the duration and time lengths of the power levels.

* * * * *